United States Patent
King et al.

(10) Patent No.: US 8,335,025 B2
(45) Date of Patent: Dec. 18, 2012

(54) METHOD AND APPARATUS FOR CONTACT IMAGE SCANNING

(75) Inventors: Anthony Michael King, Lexington, KY (US); Mark Eric Miller, Versailles, KY (US)

(73) Assignee: Lexmark International, Inc., Lexington, KY (US)

( * ) Notice: Subject to any disclaimer, the term of this patent is extended or adjusted under 35 U.S.C. 154(b) by 539 days.

(21) Appl. No.: 12/480,774

(22) Filed: Jun. 9, 2009

(65) Prior Publication Data

US 2010/0309533 A1 Dec. 9, 2010

(51) Int. Cl.
*H04N 1/46* (2006.01)
*H04N 1/00* (2006.01)

(52) U.S. Cl. ........ 358/505; 358/509; 358/512; 358/513; 358/514; 358/425

(58) Field of Classification Search .......... 358/512–514, 358/505, 509, 533, 482, 483, 425; 382/275, 382/312; 250/234–236, 208.1
See application file for complete search history.

(56) References Cited

U.S. PATENT DOCUMENTS

| 4,675,727 | A | * | 6/1987 | Sekizawa et al. | 358/533 |
| 4,855,817 | A | * | 8/1989 | Watanabe | 358/512 |
| 6,657,755 | B1 | * | 12/2003 | Campbell | 358/514 |
| 2005/0174617 | A1 | * | 8/2005 | Hosier et al. | 358/514 |

* cited by examiner

*Primary Examiner* — Cheukfan Lee
(74) *Attorney, Agent, or Firm* — John Victor Pezdek

(57) ABSTRACT

A contact image scanner comprises a light source, pixel sensors generating a signal, a lens focusing reflected light onto the pixel sensors, a color matrix filter filtering the reflected light, and a signal processing circuit generating a digital image. The method provides pixel sensors for generating a signal in response to incident light, projects light from a light source onto a document in a sequential fashion, reflects the light onto the pixel sensors, filters the reflected light with a color matrix filter, and processes the signal to generate the digital image. With the method and apparatus, each scan line of the document is illuminated with white light only once. The pixel sensors corresponding to red, green, and blue colors of each pixel of the scan line read the pixel of the scan line substantially at the same time in a substantially overlapping manner in a scan line direction without overlapping in an orthogonal direction.

19 Claims, 4 Drawing Sheets

METHOD AND APPARATUS FOR CONTACT IMAGE SCANNING

CROSS REFERENCE TO RELATED APPLICATIONS

None.

STATEMENT REGARDING FEDERALLY SPONSORED RESEARCH OR DEVELOPMENT

None.

REFERENCE TO SEQUENTIAL LISTING, ETC

None.

BACKGROUND

1. Field of the Invention

The present invention relates to an imaging system, and more particularly, to a method and apparatus for scanning images such as a document.

2. Description of the Related Art

In recent years, the use of computers for home and business purposes has increased significantly. Computer systems typically include a computer, a monitor, a scanner or all-in-one device, a fax machine, and a printer. Users frequently employ such systems for scanning, modifying, and/or creating various documents. The documents may include personal greeting cards, photographs, pamphlets, flyers, brochures, business presentations, business cards, and other personal or business related documents. Such documents are usually reproduced on a substrate or medium using a personal or business printer, and distributed to various recipients, such as family or friends, or individual business consumers in many different markets around the world. Document imaging apparatuses, such as scanners or all-in-one devices, are often used in this environment to produce electronic files of photographs and other documents. Users typically want to scan a document as quickly as possible.

Typical imaging systems employ a contact image scan bar to scan a document. A row of monochrome sensors is used that is as wide as the page being scanned. A scan line is illuminated using a sequence of red, green, and blue exposures. The line scanner moves continuously while the image information is read and a captured image is created. The continuous movement of the scan bar and sequential reading of the scan lines in different colors often results in color misregistration in the captured image. The artifact from this misregistration is often referred to as color fringing or color misregistration. Color fringing or color misregistration is very clearly seen in images that contain high spatial frequency content, such as text or line pairs. Color fringing evidences itself as rainbow colored outlines along horizontal edges. Users always prefer a faster scan of a document, so there is a tendency to increase the speed at which a document is scanned. The faster the scan bar moves, however, the more pronounced the defect or misregistration becomes visible. Current contact image scan bar systems are unable to eliminate color fringing, and the defect or misregistration is considered to be inseparable from the design.

One suggested method of reducing, but not eliminating, color fringing in a contact image scanner (CIS) has been the use of three rows of sensors in a type of scanner known as a trilinear contact image scanner. Each row of a trilinear scanner has a color filter, i.e., red, green, and blue, applied to the sensors. The image is illuminated using a white light source, such as Cold-Cathode Fluorescent Tube (CCFT), or by multiple LED's. Trilinear scanners reduce color fringing or misregistration along horizontal edges, but do not eliminate such artifacts. Additionally, such scanners suffer from defects. Trilinear scanners exhibit increased color misregistration when a document is scanned at higher speeds. Further, trilinear scanners are more expensive than other scanners because of the high costs of the materials used to construct them. Sensors are often 40% or more of the cost of a contact image scan bar. Since a trilinear scanner utilizes three rows of sensors, the material costs are three times the cost of a scanner with a single scan bar. This, of course results in a significant increase in the cost of a scanner. The data from trilinear scanners must be read out quickly and broken into smaller, parallel data streams for processing. The data are then fed to an analog front end with twelve or more analog channels. The analog front end is complicated and expensive as a result of the circuitry needed to process numerous analog channels of data.

SUMMARY OF THE INVENTION

In accord with the present invention, an imaging apparatus comprises a light source for illuminating the document, a plurality of pixel sensors for generating a signal in response to light incident thereon, a lens for focusing light from the light source reflected from the document onto the plurality of pixel sensors, a color matrix filter disposed between the pixel sensors and the light reflected from the document, and a circuit for processing the signal from the plurality of pixel sensors to generate the digital image of the document.

Further in accord with the present invention, a method for creating a digital image of a document having a length dimension comprises the steps of providing a plurality of pixel sensors for generating a signal in response to light incident thereon, projecting light from a light source onto the document in a sequential fashion along the length dimension thereof, reflecting the light projected onto the document onto the plurality of pixel sensors, filtering the light from the light source with a color matrix filter, and processing the signal from the plurality of pixel sensors to generate the digital image of the document.

Still further in accord with the present invention, an image scanner for scanning a document comprises a light source for illuminating the document, a plurality of pixel sensors for generating a signal in response to light incident thereon, a lens for focusing light from the light source reflected from the document onto the plurality of pixel sensors, a color matrix filter disposed between the pixel sensors and the light reflected from the document, and a digital circuit for processing the signal from the plurality of pixel sensors to generate a digital image of the document.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4B is a schematic depiction of a scan bar scanning an image showing color fringing due to misregistration of the scanned image.

DETAILED DESCRIPTION

Figure 1:
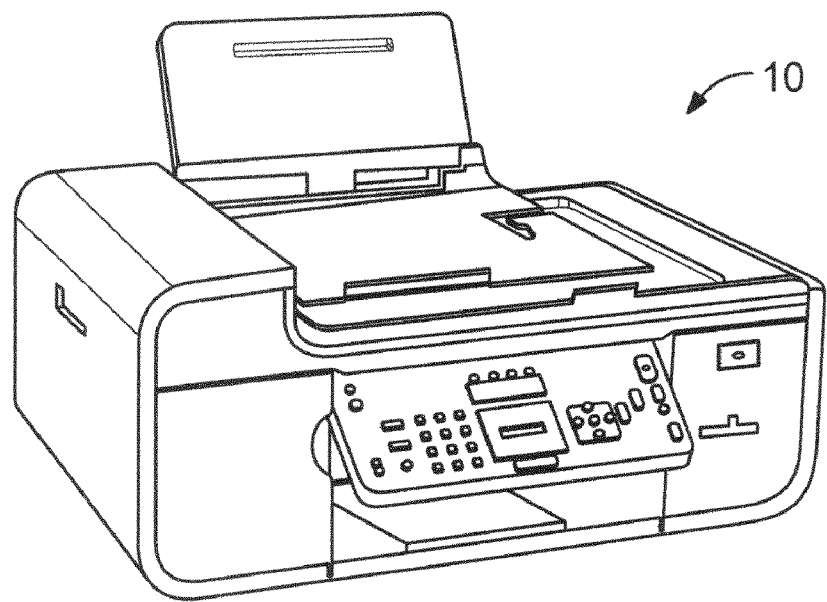
FIG. 1 is a perspective view of a scanning device in accord with the present invention.

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

Figure 2:
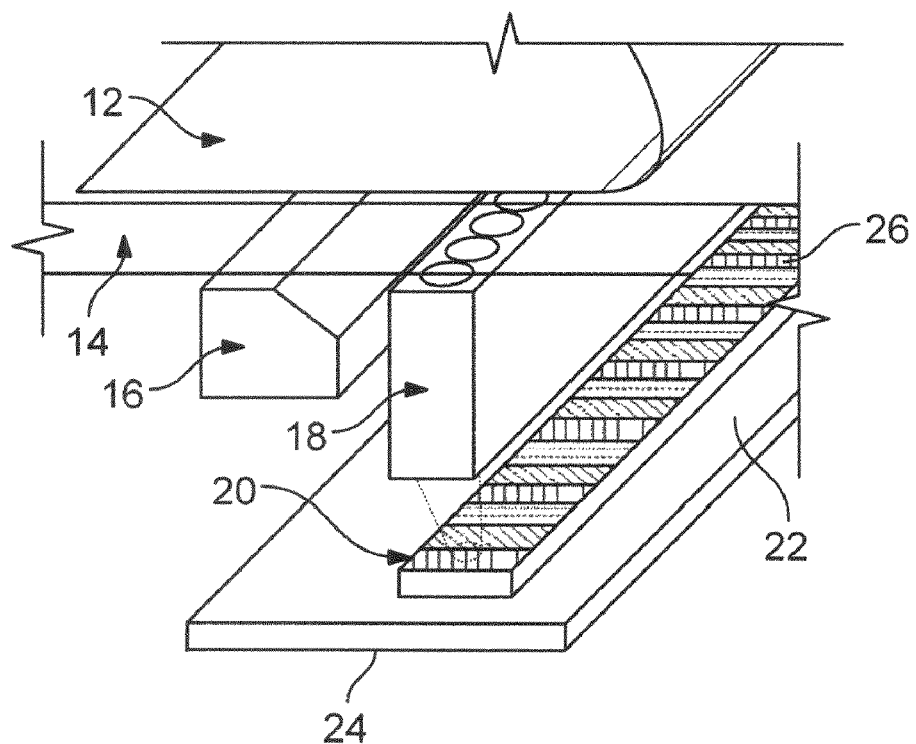
FIG. 2 is a cutaway perspective view of the scanning device of FIG. 1 with a document being scanned.

Turning to the drawings, and initially to FIGS. 1 and 2 thereof, there is depicted an image forming apparatus 10. The image forming apparatus 10 may be an electrophotographic device, scanner, copier, fax, all-in-one device, or multi-functional device. The image forming apparatus 10 scans a document 12 placed on a scanner glass 14 and generates a digital representation of an image of the document 12. The illustrated embodiment employs a contact image scanner (CIS), wherein a light source 16, a rod lens array 18, and an array of pixel sensors 20 are disposed on a frame 22 and comprise a scan bar 24. The array of pixel sensors 20 may be photovoltaic sensors. A color matrix filter 26 is disposed on top of the array of pixel sensors 20.

The light source 16, in a preferred embodiment of the present invention, may be a white light source such as white LED's, a cold cathode fluorescent lamp (CCFL), Xenon lamps, or an RGB LED source in which all three color LED's are used in the on condition.

The light source 16, the rod lens array 18, and the array of pixel sensors 20 move from the top of the document 12 to the bottom thereof by means of a gear train and stepper motor (not shown). The array of pixel sensors 20 are arranged in a single array that spans the width of the document 12 to be scanned. The array of rod lenses 18 are positioned above the array of pixel sensors 20 and focus an image of the object on the glass 14 (i.e., the document 12 positioned in the glass plane image), onto the array of pixel sensors 20. The light source 16 projects light onto the document 12. The array of rod lenses 18 focuses light reflected from the document 12 onto the array of pixel sensors 20. The array of pixel sensors 20 generates a signal in the form of a voltage level corresponding to the amount of light to which the array of pixel sensors 20 is exposed.

Figure 3A:
FIG. 3A is a depiction of a Bayer pattern color matrix filter used in an embodiment of the present invention.
Figure 3B:
FIG. 3B is a depiction of an RGB pattern color matrix filter used in an embodiment of the present invention.

As noted hereinbefore, the array of pixel sensors 20 is covered, masked or filtered with a color matrix filter 26 over a collector surface thereof. The color matrix filter 26 comprises red, green, and blue color filters in a predetermined sequence. In one embodiment, as illustrated in FIG. 3A, the sequence is R, G, B, R, G, B, etc. In one preferred embodiment, it may be that of a Bayer color matrix filter such as the one depicted in FIG. 3B, and have the sequence B, G, R, G, B, G, R, G, etc. The Bayer color matrix filter pattern is 50% green, 25% red, and 25% blue, and is commonly used in digital camera sensors. Other sequences will be suggested to those of skill in the art.

When a white light source 16 is used to expose the document 12, the pixel sensors of the array 20, as covered by the color matrix filter 26, are exposed at the same moment in time and "see", or receive a signal of, the same pixel of the document 12 being scanned. Once the array of pixel sensors 20 is exposed to the light from the light source 16, the analog voltage level for each of the sensors in the array of pixel sensors is clocked out from the scan bar 24. The pixel sensors in the array 20 generate analog signals representing scanned pixels from each line of the document 12. The color matrix filter 26 is applied to each pixel in sequential order. For example, when the color matrix filter 26 is an RGB filter, the pixels are, sequentially, Red, Green, Blue, Red, Green, Blue, etc.

Figure 4A:
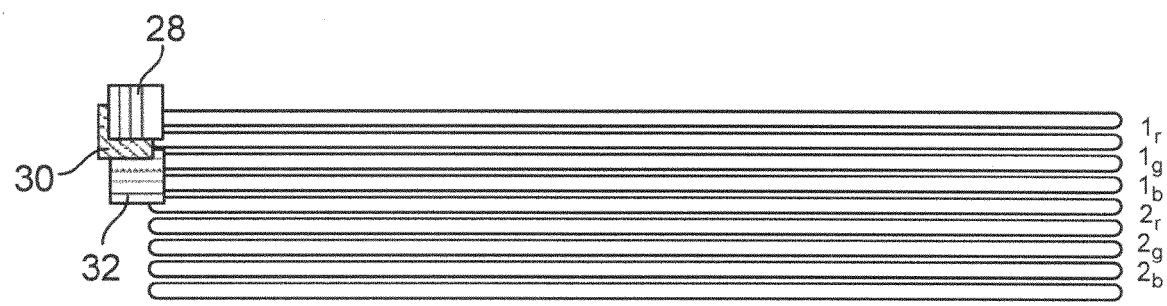
FIG. 4A is a schematic depiction of a prior art scan bar scanning an image showing color fringing due to misregistration of the scanned image.
Figure 4A:
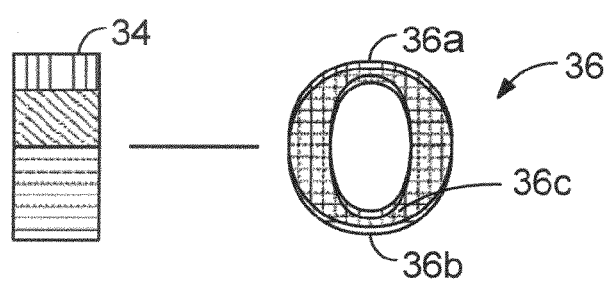

FIG. 4A schematically depicts the misregistration that occurs as a document 12 is scanned by a prior art scanner. Each line of the document 12 is scanned sequentially three (3) times by red, green or blue colored light, respectively, as represented by the lines $1_r$, $1_g$, $1_b$, $2_r$, $2_g$, $2_b$ ... and detected by pixel sensors. The overlapping red, blue and green rectangles, representing red, green and blue pixels 28, 30, 32 of a scanned line are superimposed as indicated in the overlapping rectangular area 34. The superimposition of the pixels 28, 30, 32 generates the misregistration or fringing exhibited in an image of the letter "O" 36, and this occurs because the red, green and blue pixels 28, 30, 32 overlap in both the vertical and horizontal dimensions. It will be appreciated from FIG. 4A that the image of the letter "O" 36 has an upper color fringe 36a of a red color, a lower color fringe 36b of a blue color, and a black area 36c where the scans overlap. As noted hereinbefore, the upper and lower color fringes 36b, 36a are artifacts or fringes left by the scanning process.

FIG. 4B schematically depicts the misregistration that occurs as a document 12 is scanned by the image forming apparatus 10 of the present invention. Each line 1, 2, 3, 4, 5, 6, ... of the document 12 is scanned one (1) time by white light and detected by an array of pixel sensors 20. The overlapping red, blue and green rectangles, representing red, green and blue pixels 38, 40, 42 of a scanned line 1, 2, 3, ..., are superimposed as indicated in the overlapping rectangular area 44. It will be appreciated that the pixels 38, 40, 42 overlap in only the horizontal direction, and not the vertical direction, because each line 1, 2, 3, ... is scanned only one time. The superimposition of the pixels 38, 40, 42 generates the misregistration or fringing exhibited in an image of the letter "O" 46. It will be appreciated from FIG. 4B that the image of the letter "O" 46 has a left color fringe 46a of a red color, a right color fringe 46b of a blue color, and a black area 46c where the scans overlap. It will be appreciated that the color fringe areas 46a, 46b are much smaller than the prior art color fringe areas 36a, 36b, and that the color fringe areas 46a, 46b are positioned horizontally with respect to the image of the letter "O", and not vertically as in the prior art scan.

Figure 5:
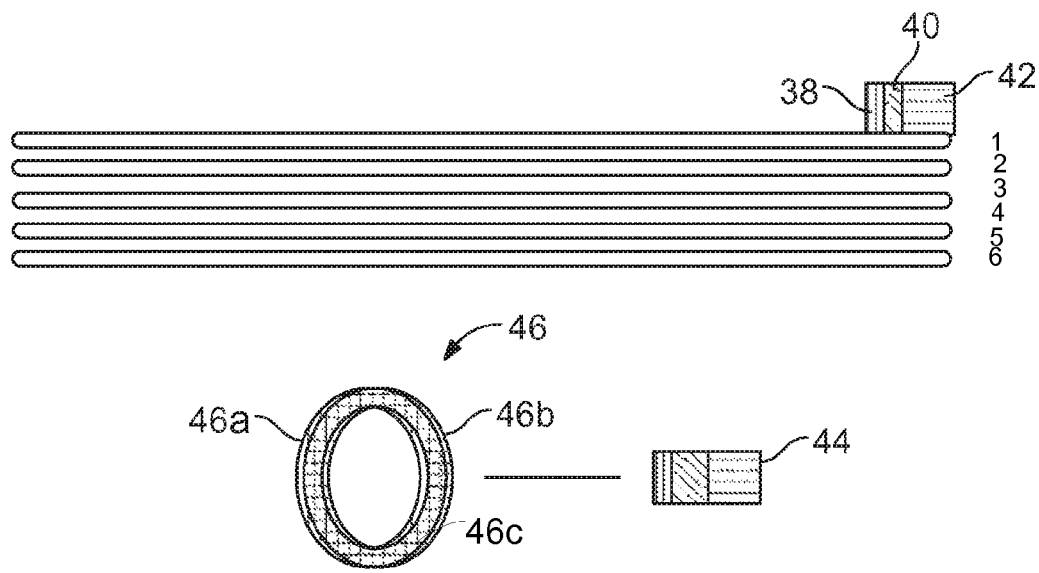
FIG. 5 is a schematic of a conversion circuit used in a scanner in accord with the present invention.
Figure 5:
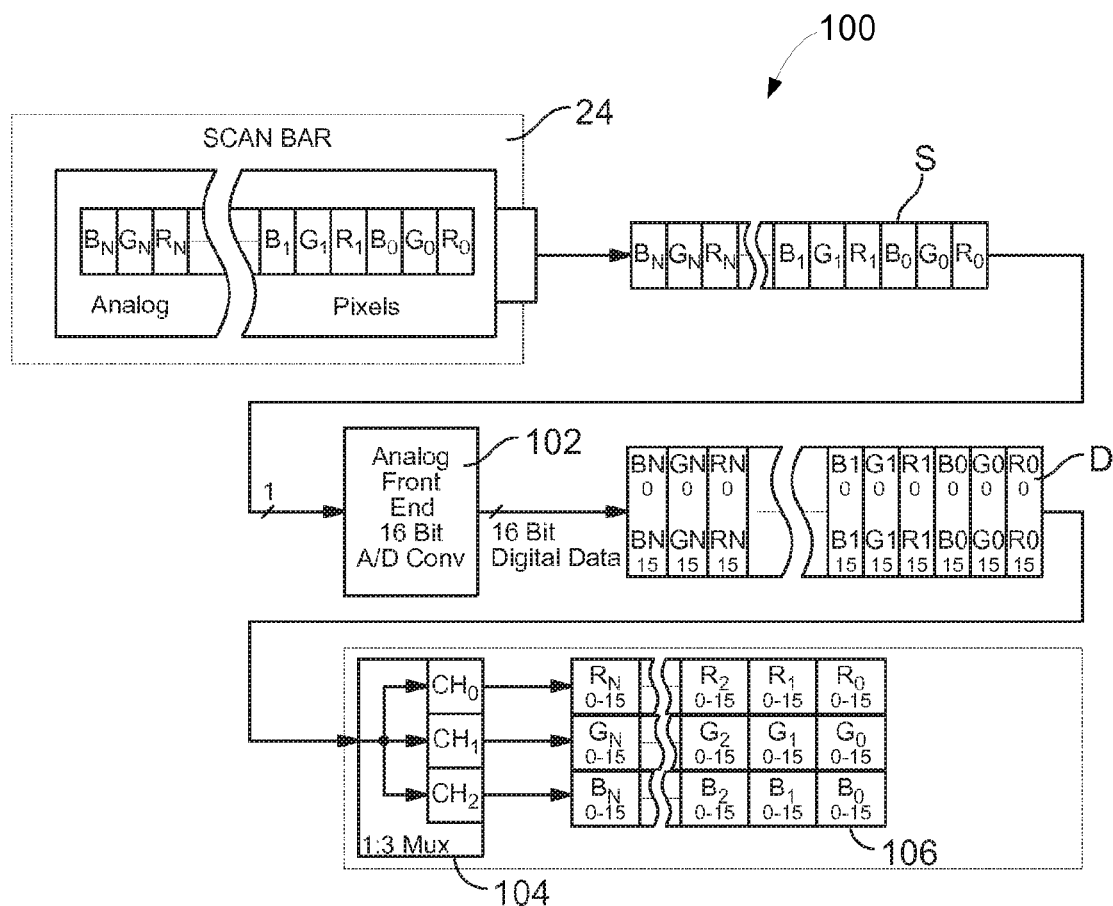

Turning now to FIG. 5, an application specific integrated circuit (ASIC) 100 is disclosed wherein an analog signal S, representing the analog pixels $B_0, G_0, R_0, B_1, G_1, R_1, \ldots B_n, G_n, R_n$, from the array of pixel sensors 20, is clocked as an input signal to an analog to digital converter and analog front end 102. The analog to digital converter 102 applies a digital offset (or gain) to each pixel value $B_0, G_0, R_0, B_1, G_1, R_1, \ldots B_n, G_n, R_n$, and then converts the analog signal S to a 16 bit digital signal D, $(B0_0, \ldots B0_{15}, B1_0, \ldots B1_{15}, \ldots BN_0, \ldots BN_{15}, G0_0, \ldots G0_{15}, G1_0, \ldots G1_{15}, \ldots GN_0, \ldots GN_{15}, R0_0, \ldots R0_{15}, R1_0, \ldots R1_{15}, \ldots RN_0, \ldots RN_{15}.)$ The digital signal D is then clocked into a digital multiplexing circuit 104. The digital multiplexing circuit 104 may be another application specific integrated circuit (ASIC) with data sorting capabilities, or alternatively, an external multiplexer. The digital multiplexing circuit 104 multiplexes the digital signal D into three (3) color channels $CH_0, CH_1$, and $CH_2$, corresponding to red, green, and blue color planes. The three (3) color channels $CH_0, CH_1$, and $CH_2$ $(R0_1 \ldots R0_{15}, G0_1 \ldots G0_{15}, B0_1 \ldots B0_{15}, \ldots RN_1 \ldots RN_{15})$ are stored in a random access memory (RAM) 106 for further digital processing.

Figure 6A:
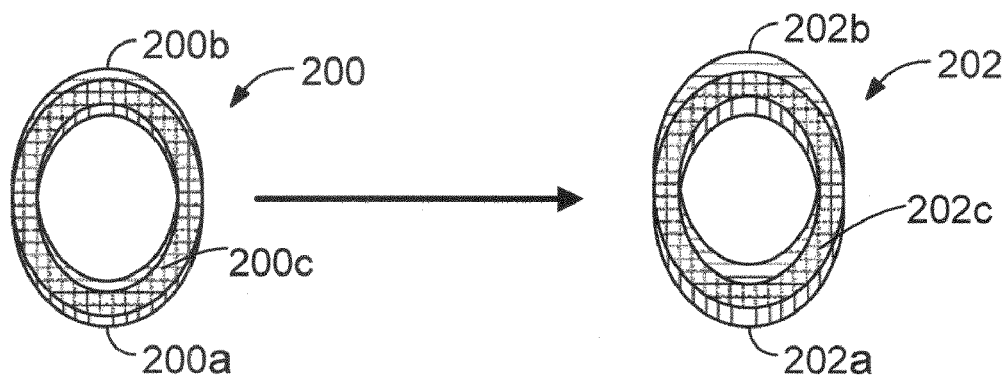
FIG. 6A is a depiction of an image produced by a prior art scanner.

FIG. 6A illustrates an image 200 of the letter "O" as scanned by a prior art scanner such as a trilinear scanner. The image 200 on the left represents the scanner operating at a slow speed, while the image 202 on the right represents the scanner operating at a higher speed. It will be appreciated from FIG. 6A that the color fringing or misregistration of the images 200, 202 is much greater when the scanner is operated at the higher speed. In particular, the area of misregistration identified by a red area 200a is much smaller than the area of misregistration identified by a red area 202a. Similarly, the area of misregistration identified by a blue area 200b is much smaller than the area of misregistration identified by a blue area 202b. The black areas, where the scans overlap, are indicated by the reference numerals 200c and 202c.

Figure 6B:
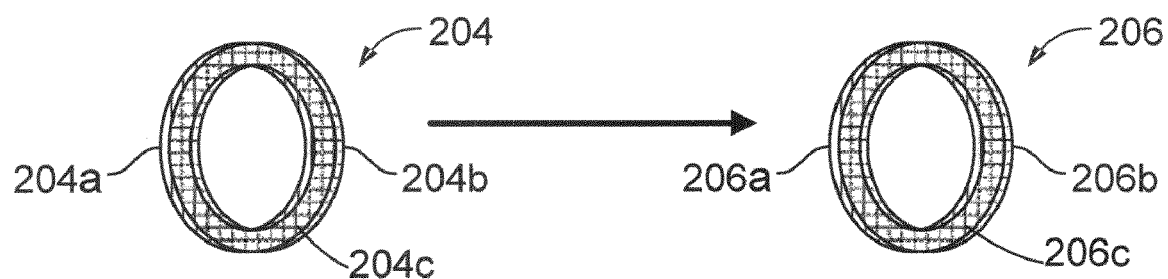
FIG. 6B is a depiction of an image produced by an embodiment of the present invention.

FIG. 6B illustrates an image 204 of the letter "O" as scanned by an image forming apparatus 10 in accord with the present invention at the same speed as the image 200 of FIG. 6A. An image 204 on the left represents the image forming apparatus 10 operating at a slow speed, while an image 206 on the right represents the image forming apparatus 10 operating at a higher speed. It will be appreciated from FIG. 6B that the color fringing or misregistration of the images 204, 206 is the same as when the image forming apparatus 10 is operated at the higher speed. In particular, the area of misregistration identified by a red area 204a is the same as the area of misregistration identified by a red area 206a. Similarly, the area of misregistration identified by a blue area 204b is the same as the area of misregistration identified by a blue area 206b. It will also be appreciated that the areas of misregistration 204a, 204b, 206a, and 206b from image forming apparatus 10 of the present invention are much smaller than the areas of misregistration 200a, 200b of the prior art scanner. The black areas, where the scans overlap, are indicated by the reference numerals 204c and 206c.

It will be further appreciated that an image forming apparatus 10 in accord with the present invention presents a superior solution to the color misregistration inherent in contact image scanning. Further, a practical embodiment of the present invention is much more cost effective than prior art trilinear devices. Still further, a practical embodiment of the present invention permits a document to be scanned at a much higher speed than prior art devices, and yet produces a superior result.

In one practical embodiment, a high-resolution scan bar was used that was capable of performing scans of 2400 pixels per inch (ppi) to 4800 ppi. The image forming apparatus 10 provided scans, at any speed, that were nearly free of any color misregistration defect at the most desirable scan modes of 300 ppi and 600 ppi.

At the present time, scan bar resolutions are much higher than digital camera resolutions. For example, a 10 mega-pixel digital camera, when imaging A4/letter sized media, has approximate equivalent pixel density of a 300 ppi scan bar. Scan bar line sensors are presently available up to 9600 ppi, which would be the equivalent of 8.5 giga-pixel digital camera. Adding a color filter array to a high-resolution scan bar would result in a high-resolution image that exceeds that of a digital camera. The filter array can be a one dimensional Bayer pattern or possibly a simple RGB pattern.

Several methods may be employed to process the RGB data from the scan bar 24. The illustrated embodiment uses a simple interpolation method, but a person of ordinary skill in the art will recognize that additional methods employing pixel lumping, averaging, area averaging, down sampling, and combinations thereof may also be used. The methods and algorithm choices depend on content, speed, and quality requirements of a specific application, and will not be detailed herein.

It will be appreciated that the disclosed use of the color matrix filter 26 and the array of pixel sensors 20 pose issues with color misregistration that are constant regardless of the speed at which the image of the document 12 is captured. In one practical embodiment, the misregistration was seen to be very small, approximately less than ¼ of a pixel. It will be appreciated that algorithms to improve on the amount of misregistration can also be employed to produce even higher quality images.

The invention, in one practical embodiment, provides a high-speed color document scanner using a low cost CIS type scanner and other known components. Sensor manufacturers have the capability of supplying arrays of pixel sensors 20 with color filters thereon, as such is a common practice on digital camera sensors. In addition, there are numerous third party suppliers who supply arrays of pixel sensors with color matrix filters superimposed thereon.

It will be appreciated that prior art contact imaging scanners have color fringing or misregistration on the horizontal lines, that is, in the direction of motion of the scan bar, and that the color fringing or misregistration increases in magnitude as the speed of the scan-bar increases. In an image forming apparatus 10 in accord with the present invention, with a one-dimensional Bayer pattern and interpolation, any artifacts are found in the vertical position, and are a function of the selected interpolation algorithm. It will be appreciated that the magnitude and severity of the misregistration or color fringing is constant regardless of the speed at which the scan bar 24 moves across the document 12, and thus permits the image forming apparatus 10 to scan a document 12 at a much higher speed than a prior art scanner.

The foregoing description of embodiments of the invention has been presented for purposes of illustration. It is not intended to be exhaustive or to limit the invention to the precise steps and/or forms disclosed, and obviously many modifications and variations are possible in light of the above teaching. It is intended that the scope of the invention be defined by the claims appended hereto.

The invention claimed is:

1. An imaging apparatus for creating a digital image of a document, comprising:
   a light source for illuminating a scan line of said document, the scan line comprising a plurality of pixels;
   a plurality of pixel sensors for generating a plurality of signals in response to light incident thereon;
   a lens for focusing light from said light source reflected from said plurality of pixels of said scan line of said document onto said plurality of pixel sensors;
   a color matrix filter disposed between said pixel sensors and said lens for filtering said reflected light from each pixel in the plurality of pixels of said scan line of said document into a plurality of colors prior to said reflected light being incident at said plurality of pixel sensors; and
   a circuit for processing said generated plurality of signals representative of said plurality of colors of said reflected light incident on said plurality of pixel sensors to generate said digital image of said document;
   wherein each scan line of said document is illuminated only once such that the plurality of pixel sensors corresponding to the plurality of colors of each pixel of said scan line of said document read said pixel of said scan line substantially at the same time in substantially overlapping manner in a scan line direction without overlapping in a direction orthogonal to said scan line direction.

2. The apparatus of claim 1, wherein said color matrix filter is a Bayer pattern color matrix filter.

3. The apparatus of claim 1, wherein said color matrix filter comprises an RGB pattern color matrix filter.

4. The apparatus of claim 3, wherein said color matrix filter is disposed adjacent said pixel sensors.

5. The apparatus of claim 1, wherein said lens comprises an array of rod lenses.

6. The apparatus of claim 1, wherein said plurality of pixel sensors comprises an array of pixel sensors.

7. The apparatus of claim 6, wherein said color matrix filter is formed integrally with said array of pixel sensors.

8. The apparatus of claim 6, wherein said array of pixel sensors supplies a plurality of analog data signals to said circuit.

9. The apparatus of claim 8, wherein said circuit includes an analog to digital converter for converting said plurality of analog data signals to a plurality of digital data signals.

10. The apparatus of claim 9, wherein said circuit includes a multiplexing circuit for multiplexing said plurality of digital data signals into a plurality of color channel signals.

11. The apparatus of claim 10, wherein said multiplexing circuit multiplexes said plurality of digital data signals into red, green, and blue color channel signals.

12. The apparatus of claim 10, wherein said circuit includes a memory for storing said plurality of color channel signals.

13. The apparatus of claim 1, wherein said light source illuminates said document with white light.

14. A method of creating a digital image of a document having a length dimension, comprising:
    providing a plurality of pixel sensors for generating a plurality of signals in response to light incident thereon;
    projecting light from a light source onto said document in a sequential fashion along the length dimension thereof thereby illuminating a plurality of scan lines, each of said plurality of scan lines comprising a plurality of pixels;
    reflecting said light projected onto said plurality of pixels of each scan line of said document onto said plurality of pixel sensors;
    filtering said reflected light from each pixel in said plurality of pixels of each scan line of said document into a plurality of colors prior to said reflected light being incident at said plurality of pixel sensors; and
    processing said generated plurality of signals representative of said plurality of colors of said reflected light incident on said plurality of pixel sensors to generate said digital image of said document;
    wherein each scan line of said document is illuminated only once such that the plurality of pixel sensors corresponding to the plurality of colors of each pixel of each scan line of said document read said pixel of each scan line substantially at the same time in substantially overlapping manner in a scan line direction without overlapping in a direction orthogonal to said scan line direction.

15. The method of claim 14, wherein said filtering said light comprises filtering said light with a Bayer color matrix filter.

16. The method of claim 14, wherein said filtering said light comprises filtering said light with a color matrix filter of RGB.

17. An image scanner for scanning a document comprising:
    a light source for illuminating a scan line of said document with white light, the scan line comprising a plurality of pixels;
    a plurality of pixel sensors for generating a plurality of signals in response to light incident thereon;
    a lens for focusing light from said light source reflected from said plurality of pixels of said scan line of said document onto said plurality of pixel sensors;
    a color matrix filter disposed between said pixel sensors and said lens for filtering said reflected light from each pixel in the plurality of pixels of said scan line of said document into a plurality of colors prior to said reflected light being incident at said plurality of pixel sensors, said plurality of colors comprising red, green and blue; and
    a circuit for processing said plurality of signals representative of said plurality of red green and blue colors of said reflected light incident on said plurality of pixel sensors to generate a digital image of said document;
    wherein each scan line of said document is illuminated with said white light only once such that the plurality of pixel sensors corresponding to said red, green, and blue colors of each pixel of said scan line of said document read said pixel of said scan line substantially at the same time in substantially overlapping manner in a scan line direction without overlapping in a direction orthogonal to said scan line direction.

18. The image scanner of claim 17, wherein said color matrix filter is a Bayer pattern color matrix filter.

19. The image scanner of claim 17, wherein said color matrix filter is disposed adjacent said pixel sensors.

* * * * *